United States Patent [19]
Mack et al.

[11] Patent Number: 5,434,567
[45] Date of Patent: Jul. 18, 1995

[54] ENCODING IMAGE SIGNALS BY FURTHER TRANSFORMING TRANSFORMED DC SIGNALS

[75] Inventors: Walter Mack; Al Simon, both of Chandler, Ariz.

[73] Assignee: Kabushiki Kaisha Toshiba, Kawasaki, Japan

[21] Appl. No.: 303,397

[22] Filed: Sep. 9, 1994

[51] Int. Cl.⁶ ............................................. H03M 7/00
[52] U.S. Cl. .................................................... 341/50
[58] Field of Search ................. 341/50, 58; 348/404, 348/405

[56] References Cited
U.S. PATENT DOCUMENTS
5,157,488 10/1992 Pennebaker .................... 348/405

Primary Examiner—Brian K. Young
Attorney, Agent, or Firm—Cushman, Darby & Cushman

[57] ABSTRACT

An image is divided into a plurality of blocks and a first transform is applied to each of the blocks to generate a plurality of first transformed blocks, wherein each of the first transformed blocks comprises a DC first transformed signal and a plurality of AC first transformed signals. A second transform is applied to the DC first transformed signals for all of the first transformed blocks to generate a plurality of second transformed signals. The second transformed signals are encoded and then the AC first transformed signals are encoded.

11 Claims, 7 Drawing Sheets

ENCODING SYSTEM

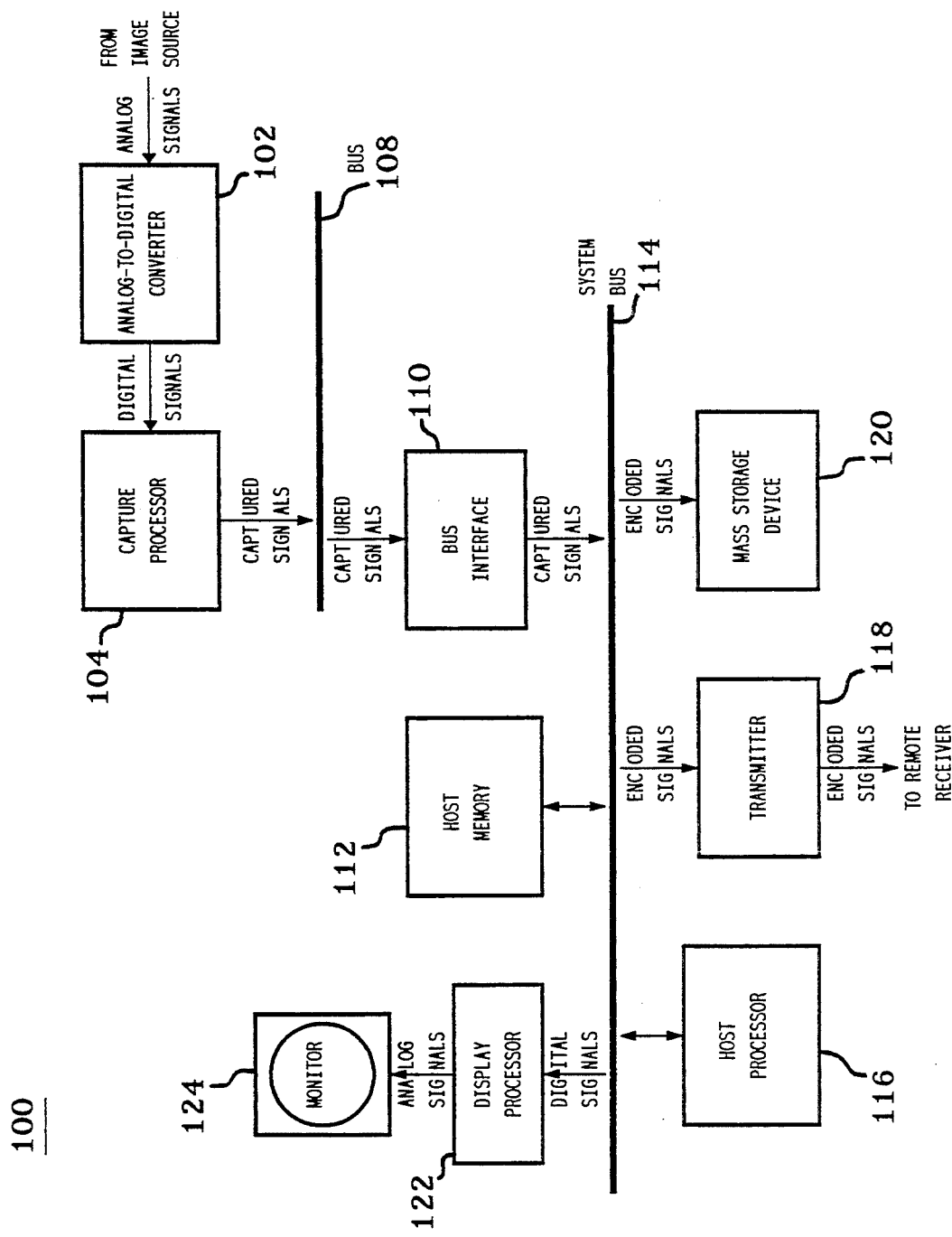
FIGURE 1. ENCODING SYSTEM

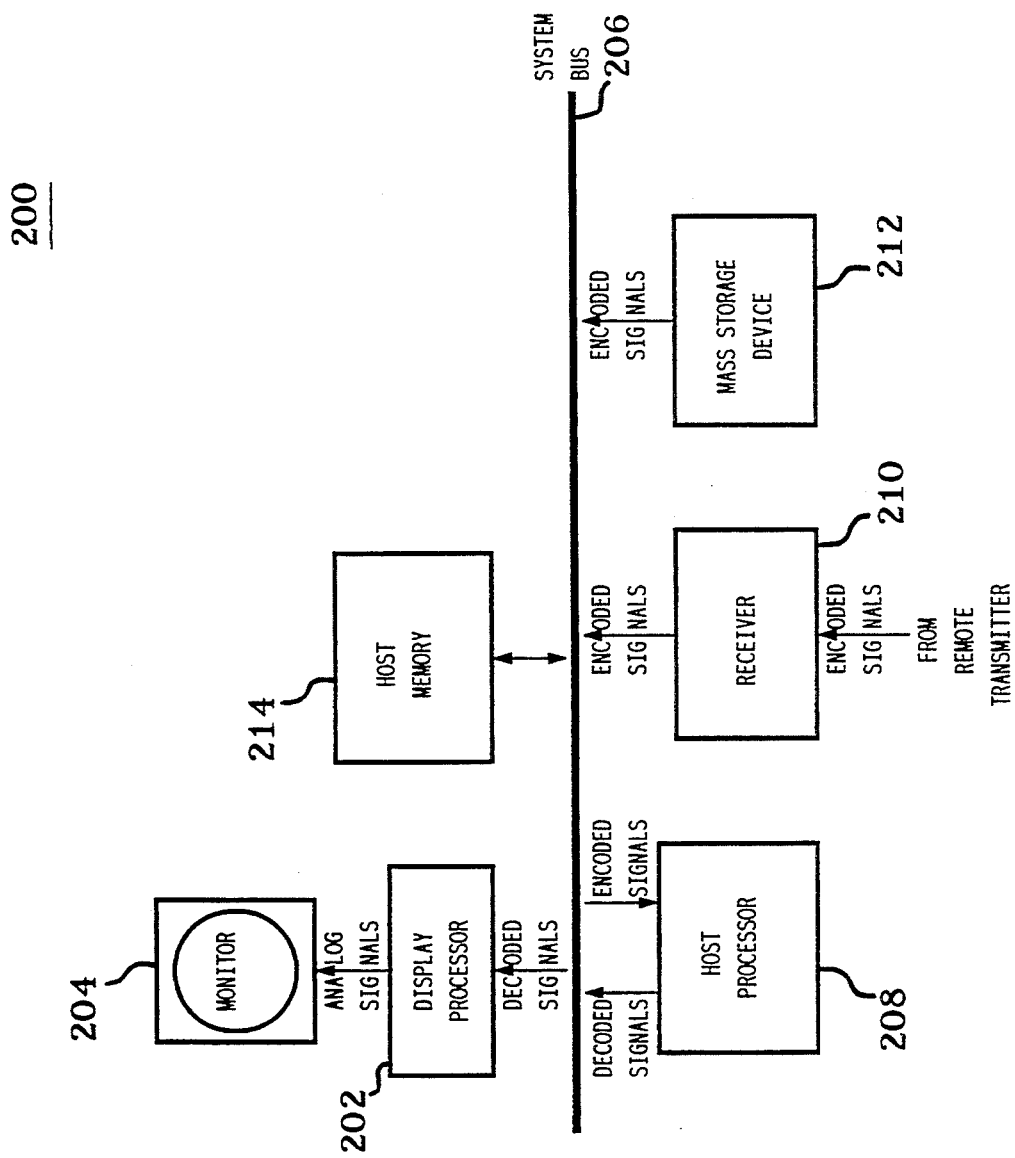
FIGURE 2. DECODING SYSTEM

FIGURE 3.   ENCODING PROCESSING
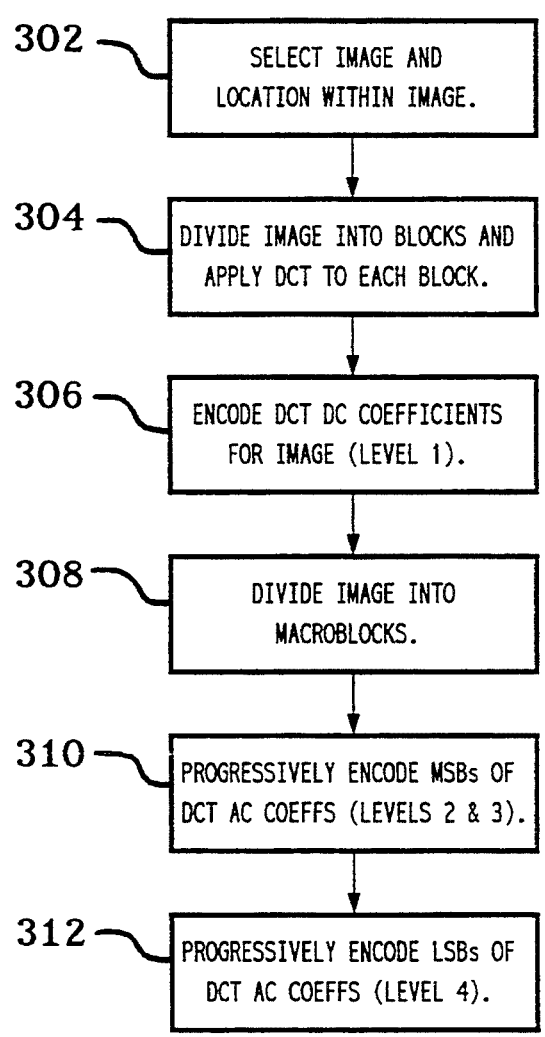

FIG. 4. SPATIAL DECOMPOSITION

400

MACROBLOCK COLUMN

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | H | H | H | H | H | H | H | H | H | H | H  | I  | J  |
| 1 | G | G | G | G | G | G | G | G | G | G | H  | I  | J  |
| 2 | F | F | F | F | F | F | F | F | F | G | H  | I  | J  |
| 3 | E | E | E | E | E | E | E | E | F | G | H  | I  | J  |
| 4 | D | D | D | D | D | D | D | E | F | G | H  | I  | J  |
| 5 | D | C | C | C | C | C | D | E | F | G | H  | I  | J  |
| 6 | D | C | B | B | B | C | D | E | F | G | H  | I  | J  |
| 7 | D | C | B | A | B | C | D | E | F | G | H  | I  | J  |
| 8 | D | C | B | B | B | C | D | E | F | G | H  | I  | J  |
| 9 | D | C | C | C | C | C | D | E | F | G | H  | I  | J  |
| 10 | D | D | D | D | D | D | D | E | F | G | H  | I  | J  |
| 11 | E | E | E | E | E | E | E | E | F | G | H  | I  | J  |

MACROBLOCK ROW

FIGURE 5.  ZIG-ZAG SCAN SEQUENCE

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIGURE 6. DECODING PROCESSING
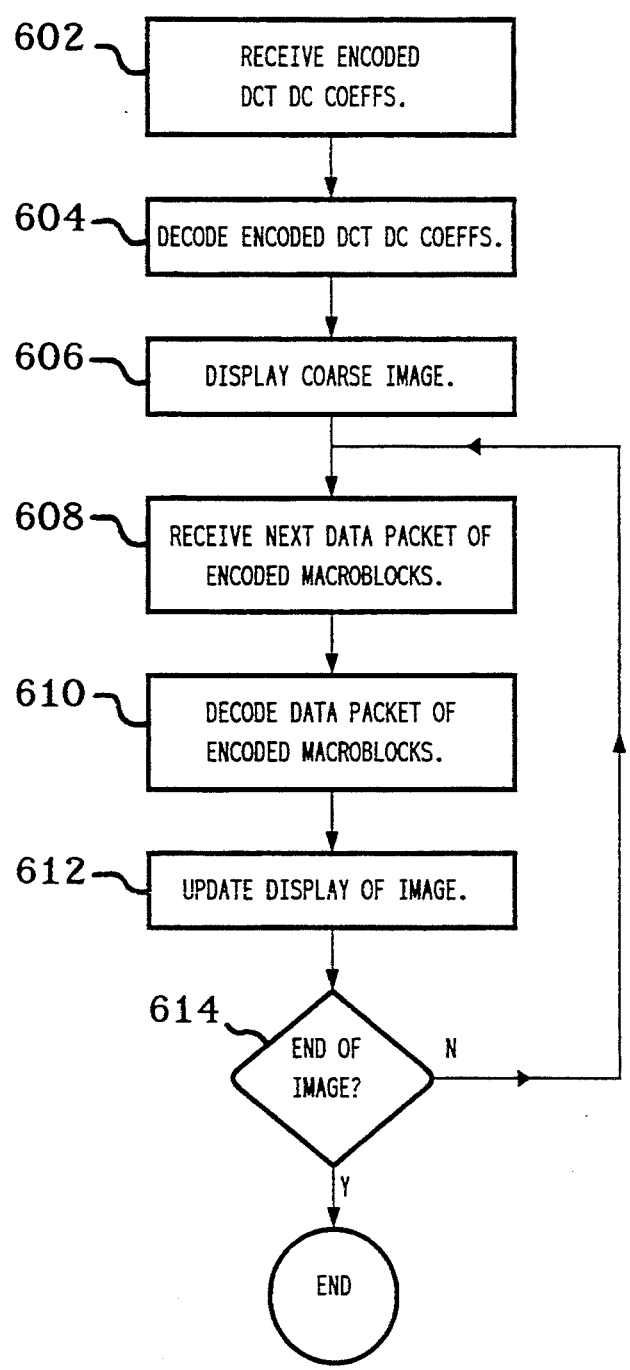

FIG. 7.  INTERPOLATION SCHEME

|   |   | BLOCK COLUMN j | BLOCK COLUMN j+1 |
|---|---|---|---|
|   |   | 0 1 2 3 4 5 6 7 | 0 1 2 3 4 5 6 7 |
| BLOCK ROW i | 0 | x x x x x x x x | x x x x x x x x |
|  | 1 | x x x x x x x x | x x x x x x x x |
|  | 2 | x x x x x x x x | x x x x x x x x |
|  | 3 | x x x x x x x x<br>y y y yDY Y Y Y | x x x x x x x x<br>Y Y Y YDy y y y |
|  | 4 | x x x x X X x x | X X X X x x x x |
|  | 5 | x x x x X X X X | X X X X x x x x |
|  | 6 | x x x X X X X X | X X X X x x x x |
|  | 7 | x x x x X X X X | X X X X x x x x |
| BLOCK ROW i+1 | 0 | x x x x X X X X | X X X X x x x x |
|  | 1 | x x x X X X X X | X X X X x x x x |
|  | 2 | x x x x X X X X | X X X X x x x x |
|  | 3 | x x x x X X X X<br>z z z zDZ Z Z Z | X X X X x x x x<br>Z Z Z ZDz z z z |
|  | 4 | x x x x x x x x | x x x x x x x x |
|  | 5 | x x x x x x x x | x x x x x x x x |
|  | 6 | x x x x x x x x | x x x x x x x x |
|  | 7 | x x x x x x x x | x x x x x x x x |

ENCODING IMAGE SIGNALS BY FURTHER TRANSFORMING TRANSFORMED DC SIGNALS

BACKGROUND OF THE INVENTION

1. Field of the Invention

The present invention relates to signal processing, and, in particular, to computer-implemented processes and apparatuses for encoding and decoding image signals for progressive transmission and display.

2. Description of the Related Art

Still images and video images typically require large numbers of bits to represent digitally, even using sophisticated compression techniques. The time required to transmit such images for display at a remote destination, and therefore the time delay between display of successive images, may prove disturbing to the remote viewer. Using a conventional progressive transmission technique, such as those based on the wavelet transform, may prove computationally intensive and therefore time consuming.

It is desirable to provide encoding systems for generating, encoding, and transmitting image signals and decoding system for receiving, decoding, and displaying image signals that reduce the delay to the remote viewer. In particular, it is desirable to provide personal computer (PC) based conferencing systems that provide the capabilities for efficient transmission of images from one conference participant to a remote conference participant over relatively low bandwidth media, such as a PSTN telephone line.

It is, therefore, an object of the present invention to provide computer-implemented processes and apparatuses for efficiently generating, encoding, and transmitting image signals and methods, apparatuses, and systems for efficiently receiving, decoding, and displaying image signals.

It is a particular object that the present invention be applicable to PC-based conferencing systems.

Further objects and advantages of this invention will become apparent from the detailed description of a preferred embodiment which follows.

SUMMARY OF THE INVENTION

The present invention is a computer-implemented process and apparatus for encoding image signals. According to a preferred embodiment, an image is divided into a plurality of blocks and a first transform is applied to each of the blocks to generate a plurality of first transformed blocks, wherein each of the first transformed blocks comprises a DC first transformed signal and a plurality of AC first transformed signals. A second transform is applied to the DC first transformed signals for all of the first transformed blocks to generate a plurality of second transformed signals. The second transformed signals are encoded and then the AC first transformed signals are encoded.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 1 is a computer-based encoding system for encoding image signals, according to a preferred embodiment of the present invention;

FIG. 2 is a computer-based decoding system for decoding the image signals encoded by the computer system of FIG. 1, according to a preferred embodiment of the present invention;

FIG. 3 is a process flow diagram of the encoding processing implemented by the computer system of FIG. 1;

FIG. 4 is a graphical representation of an example of spatial decomposition for an image comprising 12 rows and 13 columns of (8×8) blocks;

FIG. 5 shows the zig-zag scan sequence used by the computer system of FIG. 1;

FIG. 6 is a process flow diagram of the decoding processing implemented by the computer system of FIG. 2; and FIG. 7 is a graphical representation of a two-dimensional bilinear interpolation scheme, according to a preferred embodiment of the present invention.

DESCRIPTION OF THE PREFERRED EMBODIMENT(S)

The present invention is directed to the encoding and decoding of image signals. The image signals are encoded for progressive transmission such that a receiver may decode the encoded signals as they are received and display a coarse image before receiving all of the encoded signals. As more encoded signals are received and decoded, the coarse image is repeatedly updated until a full-resolution image is displayed. The image is also encoded with a spatial progression, whereby the displayed image is updated in a spatial pattern that is based on one or more selected locations within the image.

System Hardware

Referring now to FIG. 1, there is shown a computer-based encoding system 100 for encoding image signals, according to a preferred embodiment of the present invention. Analog-to-digital (A/D) converter 102 of encoding system 100 receives analog image signals from an image source. The image source may be any suitable source of analog image signals such as a still or video camera or VCR for generating local analog image signals or a cable or antenna for receiving analog image signals from a remote source. A/D converter 102 decodes (i.e., separates the signal into constituent components) and digitizes each analog image into digital image component signals (e.g., in a preferred embodiment, Y, U, and V component signals).

Capture processor 104 receives, captures, and stores the digitized component signals as subsampled images in host memory 112 via bus 108, bus interface 110, and system bus 114. Each subsampled image is represented by a set of two-dimensional component planes or pixel bitmaps, one for each component of the digitized image signals. In a preferred embodiment, capture processor 104 captures image signals in a YUV9 or YUV4:1:1 format, in which every (4×4) block of pixels of the Y component plane corresponds to a single pixel in the U component plane and a single pixel in the V component plane.

Host processor 116 accesses captured bitmaps from host memory 112 via system bus 114 and generates encoded image signals that represent one or more of the captured images. Depending upon the particular encoding method implemented, host processor 116 applies a sequence of compression techniques to reduce the amount of data used to represent the information in each image. Host processor 116 stores the encoded image signals back to host memory 112 via system bus 114. Host processor 116 may transmit the encoded image signals to transmitter 118 for real-time transmission to a remote receiver (not shown in FIG. 1), store the encoded image signals to mass storage device 120 for future processing, or both.

In addition, display processor 122 may receive and process digital image signals for display in one or more windows on monitor 124. Display processor 122 converts the digital image signals to analog image signals. The images displayed on monitor 124 may correspond, for example, to raw captured images or companded images (i.e., the results of decoding the encoded images).

Referring now the FIG. 2, there is shown a computer-based decoding system 200 for decoding the image signals encoded by encoding system 100 of FIG. 1, according to a preferred embodiment of the present invention. Encoded image signals are transmitted from either mass storage device 212 or receiver 210 via system bus 206 for storage to host memory 214. Receiver 210 receives encoded image signals from a remote transmitter, such as transmitter 118 of FIG. 1.

Host processor 208 accesses the encoded image signals from host memory 214 via system bus 206. Host processor 208 decodes the encoded image signals and stores the decoded image signals back to host memory 214. Decoding the encoded image signals involves undoing the compression processing implemented by host processor 116 of encoding system 100 of FIG. 1. The decoded image signals are then transmitted to display processor 202 via system bus 206. Display processor 202 converts the digital decoded image signals to analog image signals for display on monitor 204.

Referring again to FIG. 1, encoding system 100 is preferably a general microprocessor-based personal computer (PC) system with a special-purpose image capture plug-in board. In particular, A/D converter 102 may be any suitable means for decoding and digitizing analog video image signals. Capture processor 104 may be any suitable processor for capturing digitized video image component signals as subsampled frames. Bus 108 may be any suitable digital signal transfer device and is preferably a peripheral component interconnect (PCI) bus. Alternatively, bus 108 may be an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, bus 108, and bus interface 110 are contained in a single plug-in board, such as an Intel® Smart Video Recorder board, capable of being added to a general microprocessor-based personal computer (PC) system.

Host processor 116 may be any suitable means for controlling the operations of the special-purpose video processing board and is preferably an Intel® general purpose processor such as an Intel® i386 TM, i486 TM, or Pentium TM processor. Host memory 112 may be any suitable memory device used in conjunction with host processor 116 and is preferably a combination of random access memory (RAM) and read-only memory (ROM). System bus 114 may be any suitable digital signal transfer device and is preferably a high-speed data bus such as a PCI bus. Mass storage device 120 may be any suitable means for storing digital signals and is preferably a computer hard drive. Transmitter 118 may be any suitable means for transmitting digital signals to a remote receiver and is preferably a modem for transmitting digital signals over PSTN lines. Those skilled in the art will understand that the encoded image signals may be transmitted using any suitable means of transmission such as telephone line (PSTN or ISDN), RF antenna, local area network, or remote area network.

Display processor 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose processor such as an Intel® i386 TM, i486 TM, or Pentium TM processor. Host memory 214 may be any suitable memory device used in conjunction with host processor 208 and is preferably a combination of random access memory (RAM) and read-only memory (ROM).

System bus 206 may be any suitable digital signal transfer device and is preferably a high-speed data bus such as a PCI bus. Mass storage device 212 may be any suitable means for storing digital signals and is preferably a CD-ROM device. Receiver 210 may be any suitable means for receiving the digital signals transmitted by transmitter 118 of encoding system 100. Display processor 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded image signals in real-time during the capture and encoding of image signals to monitor the encoding processing.

Encoding Processing

Referring now to FIG. 3, there is shown a process flow diagram of the encoding processing implemented by encoding system 100 of FIG. 1, according to a preferred embodiment of the present invention. Encoding system 100 divides each component plane of a selected image into (8×8) blocks, transforms each block (preferably using the discrete cosine transform (DCT)), and encodes the transformed signals using both spectral decomposition and spatial decomposition.

Spectral decomposition refers to the encoding of selected transform coefficients prior to other coefficients as well as to the encoding of selected portions of individual coefficients prior to other portions of the same coefficients. For example, in a preferred embodiment that transforms image signals using the DCT transform, encoding system 100 encodes the DCT coefficients in four different levels. The first level comprises the DCT DC coefficient for each block of the image, the second level comprises the two most significant bits (MSBs) of the DCT AC coefficients for each block, the third level comprises the next two MSBs of the DCT AC coefficients, and the fourth level comprises the LSBs of the DCT AC coefficients.

In addition to spectral decomposition, encoding system 100 encodes the transformed image signals using spatial decomposition. Spatial decomposition refers to the encoding of signals corresponding to one or more selected locations within an image prior to the encoding of signals corresponding to other locations within the same image. In a preferred embodiment, spatial decomposition is applied in units of macroblocks, where a macroblock corresponds to a (32×32) pixel area of the image. Those skilled in the art will understand that, for an image represented in subsampled YUV9 format, a macroblock consists of 16 (8×8) blocks of Y component signals, 1 (8×8) block of U component signals, and 1 (8×8) block of V component signals.

Referring now to FIG. 4, there is shown a graphical representation of an example of spatial decomposition for a (384×416) image 400 comprising 12 rows and 13 columns of (32×32) macroblocks. In the example of FIG. 4, when image 400 is selected for encoding, the location of the image represented by macroblock row 7 and macroblock column 3 is selected (step 302 of FIG. 3). Encoding system 100 preferably encodes image signals for image 400 using a spatial progression based on the selected location, where image signals for macroblock (7,3), as indicated by letter A, are encoded prior to image signals for the 8 macroblocks indicated by letter B, image signals for the 8 B macroblocks are encoded prior to image signals for the 16 C macroblocks, etc. For a given macroblock type, image signals may be encoded using a specified pattern, such a clockwise or counterclockwise. For example, the 8 B macroblocks may be encoded starting with upper left macroblock (6,2) and proceeding clockwise to macroblock (6,3), etc. all the way around to macroblock (7,2).

In a preferred embodiment of the present invention, the spectral decomposition and spatial decomposition of image 400 are combined in an interleaved fashion, with a preferred sequence of encoding indicated in Table I.

TABLE I

| PHASE | Encoding Sequence Using Both Spectral and Spatial Decomposition. SIGNALS ENCODED |
|---|---|
| 1 | DC coeffs for all blocks (Level 1) |
| 2 | 2 MSBs for AC coeffs of A macroblock (Level 2) |
| 3 | 2 MSBs for AC coeffs of B macroblocks (Level 2) |
| 4 | 2 MSBs for AC coeffs of C macroblocks (Level 2) |
| 5 | Next 2 MSBs for AC coeffs of A macroblock (Level 3) |
| 6 | 2 MSBs for AC coeffs of D macroblocks (Level 2) |
| 7 | Next 2 MSBs for AC coeffs of B macroblocks (Level 3) |
| 8 | 2 MSBs for AC coeffs of E macroblocks (Level 2) |
| 9 | Next 2 MSBs for AC coeffs of C macroblocks (Level 3) |
| 10 | 2 MSBs for AC coeffs of F macroblocks (Level 2) |
| 11 | Next 2 MSBs for AC coeffs of D macroblocks (Level 3) |
| 12 | 2 MSBs for AC coeffs of G macroblocks (Level 2) |
| 13 | Next 2 MSBs for AC coeffs of E macroblocks (Level 3) |
| 14 | 2 MSBs for AC coeffs of H macroblocks (Level 2) |
| 15 | Next 2 MSBs for AC coeffs of F macroblocks (Level 3) |
| 16 | 2 MSBs for AC coeffs of I macroblocks (Level 2) |
| 17 | Next 2 MSBs for AC coeffs of G macroblocks (Level 3) |

TABLE I-continued

| PHASE | Encoding Sequence Using Both Spectral and Spatial Decomposition. SIGNALS ENCODED |
|---|---|
| 18 | 2 MSBs for AC coeffs of J macroblocks (Level 2) |
| 19 | Next 2 MSBs for AC coeffs of H macroblocks (Level 3) |
| 20 | Next 2 MSBs for AC coeffs of I macroblocks (Level 3) |
| 21 | Next 2 MSBs for AC coeffs of J macroblocks (Level 3) |
| 22 | LSBs for AC coeffs of A macroblock (Level 4) |
| 23 | LSBs for AC coeffs of B macroblocks (Level 4) |
| 24 | LSBs for AC coeffs of C macroblocks (Level 4) |
| 25 | LSBs for AC coeffs of D macroblocks (Level 4) |
| 26 | LSBs for AC coeffs of E macroblocks (Level 4) |
| 27 | LSBs for AC coeffs of F macroblocks (Level 4) |
| 28 | LSBs for AC coeffs of G macroblocks (Level 4) |
| 29 | LSBs for AC coeffs of H macroblocks (Level 4) |
| 30 | LSBs for AC coeffs of I macroblocks (Level 4) |
| 31 | LSBs for AC coeffs of J macroblocks (Level 4) |

Referring again to FIG. 3, each component plane of image 400 is divided into (8×8) blocks and each block is transformed using the DCT transform (step 304 of FIG. 3). According to Table I, the DC coefficients (Level 1) for all of the blocks are encoded first (phase 1 of Table I and step 306 of FIG. 3). In a preferred embodiment, the DC coefficients are intra-encoded to generate DC coefficient differences (e.g., differences between DC coefficients for consecutive blocks following a raster scan sequence). The DC coefficient differences are then quantized to generate quantized DC coefficient differences. The quantized DC coefficient differences for each component plane are then run-length encoded following a raster scan sequence to generate run-val pairs, each run-val pair consisting of (1) a run of quantized DC coefficient differences having a value of zero and (2) a value corresponding to a non-zero quantized DC coefficient difference. The run-val pairs are then variable-length encoded using one or more Huffman encoding tables. The resulting variable-length encoded signals correspond to the data portion of the encoded bit stream representing the DC coefficients of the block of the image.

The image is then divided into macroblocks, where each macroblock comprises sixteen (8×8) blocks of the Y component plane, the corresponding (8×8) block of the U component plane, and the corresponding (8×8) block of the V component plane (step 308 of FIG. 3). The macroblocks are then encoded following a selected sequence that combines spectral decomposition and spatial decomposition, where the selected sequence is based (at least in part) on the location of the image selected in step 302. In a preferred embodiment, the macroblocks are progressively encoded using three levels of spectral decomposition, where Levels 2 and 3 are interleaved (step 310) and Level 4 follows the completion of Levels 2 and 3 (step 312). As indicated above, Level 1 refers to the encoding of the DC coefficients.

In a preferred embodiment, in Level 2, the two MSBs of the DCT AC coefficients for each macroblock are encoded. In Level 3. the next two MSBs of the AC coefficients for each macroblock are encoded. In Level 4, the LSBs of the AC coefficients for each macroblock are encoded.

Referring again to Table I, in phases 2–4, the 2 MSBs for the AC coefficients (i.e., Level 2 signals) of the A macroblock, the eight B macroblocks, and the sixteen C macroblocks, respectively, are encoded. In phase 5, the next 2 MSBs for the AC coefficients (Level 3) for the A block are encoded. In phases 6–19, processing similar to phases 4 and 5 is repeated for different sets of macroblocks. After phase 18, all of the Level 2 data are encoded. Phases 20 and 21 complete the encoding of the Level 3 data. Phases 2–21 of Table I correspond to step 310 of FIG. 3 with Levels 2 and 3 interleaved. In phases 22–31, the LSBs for the AC coefficients (Level 4) are sequentially encoded from the A macroblock (phase 22) to the twelve J blocks (step 31) (step 312 of FIG. 3). After phase 31, the encoding of all 64 DCT coefficients of each block of each macroblock of image 400 is complete.

Like the DC coefficients, the selected bits of the AC coefficients for each level may be encoded using a combination of encoding techniques such as quantization, run-length encoding, and variable-length or entropy encoding. For example, in Level 2, the two MSBs of the AC coefficients for each block of a macroblock may be encoded by quantizing the AC coefficients to retain only the two MSBs of the quantized AC coefficients. In general, the bits of the AC coefficients for a given level may be extracted by quantizing the AC coefficients using appropriate quantization values and taking into account the bits that were previously encoded for those coefficients. In a preferred embodiment, the quantization values are integer powers of 2 to permit more efficient division by shifting bits.

In a preferred embodiment, the different sets of AC coefficient bits are selected by rounding the AC coefficients to the appropriate nearest value. For example, for 8-bit AC coefficients, the two MSBs may be selected by adding 32 to the AC coefficients and shifting the result right six bits (i.e., dividing by 64). The resulting two MSBs are then interpreted by the decoding system as corresponding to one of the values 32, 96, 160, and 224. Analogous processing is performed to select the next two MSBs which are interpreted by the decoding system as corresponding to one of the values −32, −16, 0, and +16.

In an alternative embodiment, the different sets of AC coefficient bits are selected by truncating the AC coefficients. For example, for 8-bit AC coefficients, the two MSBs may be selected by shifting the AC coefficient right six bits. In this case, the resulting two MSBs are interpreted by the decoding system as corresponding to one of the values 0, 64, 128, and 192. Analogous processing may be performed to select the next two MSBs which are interpreted by the decoding system as corresponding to one of the values 0, 16, 32, and 48.

The selected bits of the AC coefficients may then be run-length encoded to generate run-val pairs. Referring now to FIG. 5, there is shown a graphical representation of the zig-zag scan sequence used to run-length encode the specified bits of the DCT AC coefficients, where 0 represents the position of the DCT DC coefficient and 1–63 represent the positions of the 63 DCT AC coefficients. Those skilled in the art will understand that alternative scan sequences may also be used. The run-val pairs are then preferably variable-length encoded using one or more specified Huffman tables.

When the image signals are being encoded for real-time transmission for remote display, for example, on decoding system 200 of FIG. 2, the encoded signals are preferably transmitted as soon as, or very soon after, they are encoded. The image signals are encoded in units of macroblocks (i.e., each encoded macroblock comprises the encoded Y, U, and V component signals corresponding to a (32×32) region of the image).

The encoded signals are grouped into packets of data. In a preferred embodiment, each packet comprises an integer number of encoded macroblocks and a maximum packet size (e.g., 2000 bytes) is specified. In this case, each packet contains as many whole encoded macroblocks as possible while remaining less than or equal to the maximum packet size. Since the sizes of the encoded macroblocks vary depending upon the degree of compression attained for the different macroblocks, the number of macroblocks per packet may vary from packet to packet.

In alternative embodiments, every packet has the same specified packet size. If each packet contains only an integer number of macroblocks, then packets are preferably padded out to the specified packet size as necessary. Alternatively, if packets are allowed to contain partial macroblocks, then the beginning and end of each packet may correspond to partial macroblocks and no padding is required.

Since each packet of data comprises the encoded Y, U, and V component signals for the same region of the image, the decoder is able to decode and update the display independently for each encoded region. In a preferred embodiment, the encoded bit stream contains explicit information about the spatial decomposition so that the decoder knows where the data belongs in the decoded image.

Decoding Processing

Referring now to FIG. 6, there is shown a process flow diagram of the decoding processing implemented by decoding system 200 of FIG. 2, according to a preferred embodiment of the present invention. Decoding system 200 receives the encoded signals for an image (e.g., image 400 of FIG. 4), where the image has been encoded using the spectral decomposition and spatial decomposition of encoding system 100 of FIG. 1 as described in the previous section of this specification. Decoding system 200 decodes the encoded signals as they are received and displays the decoded signals as they are decoded. The result is the display of an initial, possibly low-quality coarse decoded image which is updated over time as more and more encoded signals are received and decoded.

In particular, decoding system 200 first receives one or more data packets containing the encoded DCT DC coefficients (Level 1) (step 602 of FIG. 6). Decoding system 200 decodes the DC coefficients (step 604) and displays a coarse image based on those decoded DC coefficients (step 606). Meanwhile (or soon after), decoding system 200 begins to receive a sequence of data packets comprising encoded macroblocks for the different levels of the spectral decomposition of the AC coefficients. As each data packet is received (step 608), the encoded macroblocks are decoded (step 610) and the image display is updated (step 612). Steps 608, 610, and 612 are repeated until all of the data packets corresponding to all of the bits of the AC coefficients are processed (step 614).

The initial image, which is based on only the decoded DC coefficients, is preferably displayed all at once. Each update to the display, however, is preferably made to one or more (but fewer than all) macroblocks of the image. As a result, the image is gradually updated in a spectral and spatial progression that follows a pattern, such as that shown in FIG. 4 for image 400 and listed in Table I.

The result is that the viewer is presented after a relatively short delay with a display of a coarse image that is at least an approximation of the original image. The quality of the displayed image is then progressively improved, wherein the sequence with which different regions of the image are updated is based on the one or more locations that were selected when the image was encoded. Those skilled in the art will understand that the selection of the most important one or more locations of an image provides the viewer with a display that presents the most important information in an efficient and timely manner.

The DC coefficient for each image block corresponds to the average of the component values for that block. After decoding system 200 receives and decodes the DC coefficients for an image, decoding system 200 could replicate each DC coefficient for all 64 pixels of the corresponding block to display a blocky image. In a preferred embodiment, however, decoding system 200 performs a two-dimensional bi-linear interpolation scheme using the DC coefficients to generate a blurred image for display. The blurred image may more closely approximate the full-resolution image than the blocky image that would result from merely replicating the DC coefficient within each block.

Referring now to FIG. 7, there is shown a graphical representation of a two-dimensional bilinear interpolation scheme, according to a preferred embodiment of the present invention. FIG. 7 shows four (8×8) blocks: blocks (i,j), (i+1,j), (i,j+1), and (i+1,j+1). Decoding system 200 decodes the encoded Level 1 signals to generate DC DCT coefficients D(i,j), D(i+1,j), D(i,j+1), and D(i+1,j+1) corresponding to these four blocks. Decoding system 100 treats each DC DCT coefficient as the value at the center of each (8×8) block, where the center of the (8×8) block does not correspond to a particular pixel, but rather to a position between the four central pixels of the block.

Decoding system 200 interpolates horizontally between D(i,j) and D(i+1,j) to generate eight different Y values. Decoding system 200 also interpolates horizontally between D(i+1,j) and D(i+1,j+1) to generate eight different Z values. Like the four D values, the eight Y and eight Z values do not correspond to particular pixels.

Decoding system 200 then interpolates vertically between each Y value and its corresponding Z value (i.e., the Z value in the same column) to generate eight different X values, where the X values do correspond to the pixel component values of the blurred image.

To perform both the horizontal and vertical interpolations, decoding system 200 preferably determines an incremental change based on the overall change between the end point values. For example, when interpolating horizontally between D(i,j) and D(i+1,j), decoding system 200 generates an incremental change I using the following equation:

$$I = [D(i+1,j) - D(i,j)]/16.$$

The interpolated values are then generated using the incremental change I, which is equivalent to half the change between the interpolated pixel component values. Thus, for example, for column 4:

$$Y(4) = D(i,j) + I$$

and, for column 5:

$$Y(5) = Y(4) + 2*I.$$

This interpolation processing is repeated for each set of four DC coefficients that correspond to each (2×2) set of four blocks to generate the blurred image. For those blocks lying at the edge of the image, the corresponding interpolation increments may be used to extrapolate those pixels that lie in the outer four columns and four rows of the image.

In alternative embodiments, decoding system 200 may apply higher order interpolation schemes such as those based on quadratic, cubic, or spline interpolation.

In alternative embodiments, the four DC coefficients D(i,j), D(i+1,j), D(i,j+1), and D(i+1,j+1) may be assumed to correspond to particular pixels rather than to the centers of the (8×8) blocks. For example, in FIG. 7, each DC coefficient may be used as the value for pixel (3,3) of the corresponding (8×8) block. Those skilled in the art will understand that, in such case, the two-dimensional interpolation scheme will be slightly different and potentially more efficient.

As decoding system 200 receives bits corresponding to the AC coefficients, the inverse transform may be applied to the newly received bits and the results added to the previously generated pixels to update the pixel values. Alternatively, the newly received bits may be combined with the previously received DCT coefficients and the inverse transform may be applied to the updated DCT coefficients to generate updated pixel values. When motion compensation is performed, the latter method may be preferable to reduce memory usage.

Alternative Embodiments

In addition to the embodiment disclosed above, there are numerous alternative embodiments that fall within the scope of the present invention.

The disclosed embodiment of Table I is based on the DCT transform. Other transforms, such as the slant transform, the Haar transform, and the Hadamard transform, may also be used.

The spatial decomposition of the disclosed embodiment was based on the selection of a single location within the selected image. Other preferred embodiments may be based on the selection of two or more locations or even the selection of one or more regions of the image.

In a preferred embodiment, an operator of encoding system 100 of FIG. 1 uses a computer mouse to select one or more image locations while the image is displayed on local monitor 124. The spatial decomposition pattern used to encode the image is then based on the one or more selected image locations. In an alternative preferred embodiment, encoding system 100 may be designed to select the one or more image locations adaptively and automatically (i.e., without direct operator assistance). For example, when used in a teleconferencing system, encoding system 100 may perform image recognition processing to locate automatically the centers of human faces in the images. The locations of the centers of the human faces may then be selected for the spatial decomposition patterns used to encode the images.

In another alternative embodiment, the user of the decoding system may change the selection of the image location used for spatial decomposition. In this embodiment, there is two-way real-time communication between the encoding system and the decoding system.

The initial selection of the image location for spatial decomposition is made at the encoding system and the initial sets of image data transmitted from the encoding system to the decoding system are generated using spatial and spectral decomposition based on the initial selected location.

Before all of the image data is transmitted, however, the user of the decoding system may change the selection of the image location. For example, based on the display of the partial image data at the decoding system, the user may use the mouse to select a different location of interest. The new selected location is transmitted from the decoding system to the encoding system, which then uses the new selected location to complete the spatial and spectral decomposition of the image. That is, the rest of the image data is transmitted from the encoding system to the decoding system using spatial and spectral decomposition based on the new selected location. At the decoding system, the rest of the updates to the displayed image will follow a pattern based on the new selected location, thereby improving the quality of the image based on the user's selected location of interest.

In the disclosed embodiment of FIG. 4, the spatial decomposition was based on concentric squares of blocks surrounding the selected image location. In alterative embodiments, spatial decomposition may be based on other criteria, such as geometric distance from the selected image location.

The spectral decomposition of the disclosed embodiment of Table I uses four levels to encode the image signals, where the second and third levels are interleaved. Other preferred embodiments may use fewer than four or more than four levels. The levels may have different numbers of bits associated with them. Moreover, the interleaving of levels may be changed or even eliminated.

In the disclosed embodiment, each level in the spectral decomposition comprises a fixed number of bits from each of the 63 AC coefficients of each block of each macroblock (i.e., Levels 2 and 3 encode 2 bits each and Level 4 encodes the LSBs). In an alterative preferred embodiment, quantization tables may be used to select different numbers of bits for each of the AC coefficients in each of the different levels in the spectral decomposition, where a different quantization table is defined for each encoding level.

For example, a quantization table may be defined such that Level 2 comprises the 2 MSBs for each of the 30 low-frequency AC coefficients and the 3 MSBs for each of the 33 high-frequency AC coefficients. Moreover, these quantization tables may be defined such that different numbers of overall bits are encoded for different AC coefficients. For example, the quantization tables may be defined such that Levels 2–4 together encode the 8 MSBs of the lowest frequency AC coefficient, while the 10 MSBs of the highest frequency AC coefficient are encoded.

Furthermore, different sets of quantization tables associated with different quantization levels may be defined as part of a bit rate controller that can be used to tune the encoding processing to the encoding bandwidth, transmission bandwidth, and/or decoding bandwidth available in the current system. Such a system may be timed to optimize the time at which detail becomes visible and to control the time delay between updates at the decoder.

The bit rate controller may adaptively select the quantization tables or quantization levels based on the image content. For example, for a flat image (i.e., an image with relatively low spatial contrast), it may be desirable to transmit more bits for Level 2 than for a busy image (i.e., an image with relatively high spatial contrast). The bit rate controller may quantify the image content using a selected measure (e.g., pixel variance) and select the quantization levels accordingly.

In another alternative embodiment, the AC coefficients may be ordered by magnitude for transmission. In such an embodiment, the ordering may need to be explicitly encoded into the transmitted bit stream.

In general, encoding system 100 of FIG. 1 may be designed such that the spatial and spectral decomposition patterns are programmable. The spatial and spectral decomposition patterns may be driven by parameters, that may include, but are not limited to, the number of levels in the spectral decomposition, the degree of interleaving of levels in the spectral decomposition, the numbers of bits per level in the spectral decomposition, the number of locations selected in the image for spatial decomposition, and the geometric progression of the spatial decomposition.

The spectral decomposition of the disclosed embodiment was based on sending all of the DC coefficients followed by levels that comprise parts (i.e., specified numbers of bits) of all of the AC coefficients. Alternative preferred embodiments may employ different types of spectral decomposition. For example, in an alternative embodiment, Level 1 may comprise the DC coefficients (coefficient 0 of FIG. 5), Level 2 may comprise all of the bits for only three low-frequency AC coefficients (coefficients 1, 2, and 4 of FIG. 5), Level 3 may comprise all of the bits for only twelve AC coefficients (coefficients 3, 5–9, 11–23, 17, 18, and 24 of FIG. 5), and Level 4 may comprise all of the bits for the rest of the AC coefficients.

In the disclosed embodiment, the DC and AC coefficients are generated by applying a DCT transform to each (8×8) block. Since the DC coefficients are the average of the 64 pixel components in a block, the DC coefficients may be generated directly by averaging the pixel components. The AC coefficients may be generated by applying the DCT transform as in the disclosed embodiment. This may result in faster generation of DC coefficients and therefore a shorter time delay before the initial coarse image is displayed at the decoder.

In the disclosed embodiment, the DC coefficients are encoded by variable-length encoding the quantized differences. In alternative embodiments, an additional transform may be applied to the DC coefficients for further encoding. The additional transform may be a DCT or slant transform, but is preferably a lossless transform, such as a Haar or Hadamard transform. For example, a Haar transform may be applied to (2×2) blocks of DC coefficients. The results of this additional transformation may also be arranged hierarchically using either spectral decomposition or spatial decomposition or both.

In the disclosed embodiment, the DC coefficients are intra encoded as differences with respect to an adjacent DC coefficient within the image. In alternative embodiments, each DC coefficient may be intra-encoded based on a difference with respect to two or more adjacent DC coefficients within the image. For example, referring again to FIG. 7, the DC coefficient $D(i+1,j+1)$ may be encoded as the difference value:

$$D(i+1,j+1)-\{[D(i,j+1)+D(i+1,j)]/2\}.$$

That is, the difference value used to encode each DC coefficient is the difference between the DC coefficient and the average of two adjacent DC coefficients. The DC coefficients for those blocks at the top edge or left edge of the image may be treated as special cases (e.g., using specified values such as 128 in the difference computation for D(i,j+1) or D(i+1,j)). The DC coefficient difference values may then be further encoded using run-length encoding and variable-length encoding.

In the disclosed embodiment, the encoded signals are transmitted in real-time to the remote decoder for real-time decoding and display. In alternative embodiments, the encoded signals may be stored to a storage device. A decoder may then access the encoded signals from the same or similar storage device for non-real-time display of the images. In a preferred embodiment, the decoder may be used to browse through a database library of images, where the operator may choose to terminate the display of a particular image in real time before all of the levels of encoded signals are decoded and displayed.

In the disclosed embodiment, the initial image displayed by the decoder is a blurred image generated by interpolating between the DC coefficients. In an alternative embodiment, the encoder also generates the blurred image and then uses that blurred image to encode the original image. For example, the encoder may (1) generate the disclosed Level 1 data from the DC coefficients, (2) generate the same blurred image as the decoder using the decoded DC coefficients, (3) generate a difference image between the original image and the blurred image, and (4) transform the difference image to encode the other levels of data using spectral and spatial decomposition. In this case, corrections to the DC coefficients may need to be included in the higher level data.

For the encoded AC signals, the decoder may update the display in various ways. For example, the decoder may update the display after each macroblock of encoded AC signals is decoded. Alteratively, the decoder may decode a specified number of macroblocks before updating the display. In another alternative embodiment, the decoder may update the image display after each data packet is decoded, where different data packets may contain different integer numbers of macroblocks.

The disclosed embodiment involves the encoding, transmission, decoding, and display of still images. In alternative embodiments, the encoding and decoding systems may be designed to encode, transmit, decode, and display motion video images. In such a way, the systems may be used for video conferencing applications. When processing video image signals, encoding system 100 may generate the interframe differences between DCT coefficients for successive frames and applies spectral and spatial decomposition to those DCT differences. The process of updating the display of a particular frame may be terminated before the image is fully decoded if, for example, encoded signals for the next frame begin to be received at the decoder.

When displaying successive images, either for still images or motion video images, decoding system 200 may apply a progressive fade-in technique. In a preferred embodiment, the progressive fade-in involves generating the pixel components for an image to be displayed ($p_{display}$) using the pixel components for the old (i.e., previous) image ($P_{old}$) and the available pixel components for the new (i.e., current) image ($P_{new}$), such that:

$$P_{display}=F*p_{new}+(1-F)*p_{old}$$

where F is a function representing the blending fraction for the new image. In general, the function F defines a blending profile that characterizes the progression of the fade-in from the old image to the new image. In a preferred embodiment, the blending function F increases as each level of encoded data is received by the decoder. Thus, as the new image becomes more and more complete based on the spectral and spatial progressions, more and more of the new image is used in the display. For still images, the progressive fade-in may be more pleasing to the viewer. For motion video images, the progressive fade-in may help simulate motion between successive images and smooth the transition associated with scene changes.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding image signals, comprising the steps of:
    (a) dividing an image into a plurality of blocks;
    (b) applying a first transform to each of the blocks to generate a plurality of first transformed blocks, wherein each of the first transformed blocks comprises a DC signal and a plurality of AC signals;
    (c) applying a second transform to the DC signals for all of the first transformed blocks to generate a plurality of second transformed signals;
    (d) encoding the second transformed signals; and
    (e) then encoding the AC signals, wherein step (c) comprises the steps of:
        (1) dividing the DC signals into a plurality of DC blocks, wherein each DC block comprises a plurality of DC signals; and
        (2) applying the second transform to each DC block to generate the plurality of second transformed signals, wherein:
            the second transform is a two-dimensional transform;
            the second transform is applied to each DC block independent of each other DC block; and
            for each DC block, the number of DC signals equals the number of second transformed signals.

2. The process of claim 1, wherein the first transform is a discrete cosine transform.

3. The process of claim 2, wherein the second transform is a lossless transform.

4. The process of claim 1, wherein the second transform is a lossless transform.

5. The process of claim 1, wherein the first transform is different from the second transform.

6. An apparatus for encoding image signals, comprising:
    (a) means for dividing an image into a plurality of blocks;

(b) means for applying a first transform to each of the blocks to generate a plurality of first transformed blocks, wherein each of the first transformed blocks comprises a DC signal and a plurality of AC signals;

(c) means for applying a second transform to the DC signals for all of the first transformed blocks to generate a plurality of second transformed signals;

(d) means for encoding the second transformed signals; and (e) means for then encoding the AC first transformed signals, wherein means (c):

(1) divides the DC signals into a plurality of DC blocks, wherein each DC block comprises a plurality of DC signals; and (2) applies the second transform to each DC block to generate the plurality of second transformed signals, wherein:

the second transform is a two-dimensional transform;

the second transform is applied to each DC block independent of each other DC block; and for each DC block, the number of DC signals equals the number of second transformed signals.

7. The apparatus of claim 6, wherein the first transform is a discrete cosine transform.

8. The apparatus of claim 7, wherein the second transform is a lossless transform.

9. The apparatus of claim 6, wherein the second transform is a lossless transform.

10. The apparatus of claim 6, wherein the first transform is different from the second transform.

11. The apparatus of claim 6, wherein the apparatus is electrically connected to a bus and the bus is electrically connected to a memory device.

* * * * *

UNITED STATES PATENT AND TRADEMARK OFFICE
CERTIFICATE OF CORRECTION

PATENT NO.    : 5,434,567
DATED         : July 18, 1995
INVENTOR(S)   : Walter Mack; Al Simon It is certified that error appears in the above-indentified patent and that said Letters Patent is hereby corrected as shown below:

On the title page item [73],

Delete "Kabushiki Kaisha Toshiba, Kawasaki, Japan".
    Insert --Intel Corporation, Santa Clara, California--.

On the title page item [56],

Delete "Cushman, Darby & Cushman".
    Insert --Steve Mendelsohn; William H. Murray--.

Signed and Sealed this

Third Day of October, 1995

Attest:

BRUCE LEHMAN

*Attesting Officer*      *Commissioner of Patents and Trademarks*